(12) United States Patent
Affeldt et al.

(10) Patent No.: US 6,305,838 B1
(45) Date of Patent: Oct. 23, 2001

(54) PROCESS AND APPARATUS FOR PREPARING PIGMENT FLUSH

(75) Inventors: Donald C. Affeldt, Warren, MI (US); Robert John Cunigan, Elizabethtown, KY (US); Joseph B. Price, Birmingham, MI (US)

(73) Assignee: Flint Ink Corporation, Ann Arbor, MI (US)

( * ) Notice: Subject to any disclaimer, the term of this patent is extended or adjusted under 35 U.S.C. 154(b) by 0 days.

(21) Appl. No.: 09/776,588

(22) Filed: Feb. 2, 2001

Related U.S. Application Data

(62) Division of application No. 09/397,801, filed on Sep. 17, 1999.

(51) Int. Cl.[7] .................................................... B09B 9/16
(52) U.S. Cl. ............................ 366/349; 366/76.1; 366/83; 100/45
(58) Field of Search ..................................... 106/504, 400, 106/493, 31.6; 100/37, 145; 366/348, 349, 154.1, 83, 76.2, 76.3, 76.4; 523/161, 160

(56) References Cited

U.S. PATENT DOCUMENTS

| | | |
|---|---|---|
| 2,985,909 | 5/1961 | Smith et al. . |
| 3,035,306 | 5/1962 | Rossiter . |
| 3,070,836 | 1/1963 | De Haven et al. . |
| 3,195,178 | 7/1965 | Carton et al. . |
| 3,235,640 | 2/1966 | Carton et al. . |
| 3,383,096 * | 5/1968 | Braibanti et al. .................... 366/76.2 |
| 3,742,093 | 6/1973 | Skidmore . |
| 3,802,670 | 4/1974 | Okada et al. . |
| 3,873,474 | 3/1975 | Ficker . |
| 3,917,507 | 11/1975 | Skidmore . |
| 3,942,767 * | 3/1976 | Hanzawa et al. .................... 366/76.2 |
| 3,968,742 * | 7/1976 | Kerr ...................................... 100/37 |
| 3,993,292 | 11/1976 | Skidmore . |

(List continued on next page.)

FOREIGN PATENT DOCUMENTS

| | | |
|---|---|---|
| 915689 * | 7/1954 | (DE) . |
| 24 37 510 A * | 2/1976 | (DE) . |
| 3248659 A1 * | 5/1984 | (DE) . |
| 44 46 129 A1 * | 6/1995 | (DE) . |
| 0255667 * | 10/1988 | (EP) . |
| 81735 * | 1/1964 | (FR) . |
| 1 431 978 * | 4/1976 | (GB) . |
| 2 034 628 A * | 6/1980 | (GB) . |
| 2067510 * | 7/1981 | (GB) . |
| 57053568 * | 3/1982 | (JP) . |
| 5-51532 * | 3/1993 | (JP) . |

OTHER PUBLICATIONS

Derwent Abstract of Patent Families, Dialog—Internet, Sep. 25, 2000, 25 pages.*

*Primary Examiner*—Tony G. Soohoo
(74) *Attorney, Agent, or Firm*—Harness, Dickey & Pierce, P.L.C.

(57) ABSTRACT

The present invention provides a process for continuous production of pigment flushes and an apparatus for carrying out the process. In the process of the invention, the pigment press cake is first fluidized. The fluidized press cake and a hydrophobic liquid organic medium are fed into a twin screw extruder. The kneading of the organic medium and press cake between the twin screws flushes the pigment into the organic medium. The water phase and flushed pigment phase are separated by removing at least part of the water phase through a vent in the extruder. An impediment to the flow of material downstream of the water vent causes the flush to accumulate in the vented section for a period of time sufficient to remove the desired amount of the water phase. The flush works over the impediment and passes downstream to where vacuum is applied to remove residual water from the flush. The flush may be further combined with other ink ingredients to form an ink product.

10 Claims, 3 Drawing Sheets

U.S. PATENT DOCUMENTS

| | | |
|---|---|---|
| 4,054,271 | 10/1977 | Lanzillo . |
| 4,300,954 | 11/1981 | de Monterey et al. . |
| 4,309,223 | 1/1982 | Rouwhorst et al. . |
| 4,309,320 * | 1/1982 | Arora et al. .......................... 106/504 |
| 4,366,271 * | 12/1982 | Riegler ............................. 73/863.23 |
| 4,431,598 | 2/1984 | Korpman . |
| 4,443,591 | 4/1984 | Schmidt et al. . |
| 4,446,094 | 5/1984 | Rossiter . |
| 4,474,473 | 10/1984 | Higuchi et al. . |
| 4,659,300 | 4/1987 | Schwarz . |
| 4,663,103 | 5/1987 | McCullough et al. . |
| 4,722,680 | 2/1988 | Rossberger et al. . |
| 4,747,882 | 5/1988 | Schwartz et al. . |
| 4,776,269 | 10/1988 | Coggins et al. . |
| 4,789,507 | 12/1988 | Wesley et al. . |
| 4,794,011 * | 12/1988 | Schumacher ........................ 426/448 |
| 4,802,769 * | 2/1989 | Tanaka ............................... 366/76.1 |
| 4,830,801 | 5/1989 | Rossberger et al. . |
| 4,910,236 * | 3/1990 | Foye et al. .......................... 523/333 |
| 4,943,402 | 7/1990 | Kafka et al. . |
| 5,108,509 * | 4/1992 | Booth et al. ........................ 106/504 |
| 5,151,026 | 9/1992 | Andersen et al. . |
| 5,160,441 | 11/1992 | Lundquist . |
| 5,205,930 | 4/1993 | Obrestad . |
| 5,232,649 | 8/1993 | Andersen et al. . |
| 5,417,854 | 5/1995 | Day et al. . |
| 5,431,721 * | 7/1995 | Pennaz et al. ...................... 106/31.4 |
| 5,436,300 | 7/1995 | Kashiwadate et al. . |
| 5,466,370 | 11/1995 | Day et al. . |
| 5,480,541 | 1/1996 | Day et al. . |
| 5,480,756 | 1/1996 | Mahabadi et al. . |
| 5,489,381 | 2/1996 | Day et al. . |
| 5,743,948 | 4/1998 | Laszewski et al. . |
| 5,756,659 | 5/1998 | Hughes et al. . |
| 5,758,961 * | 6/1998 | Deal et al. ......................... 366/76.1 |
| 5,820,667 * | 10/1998 | Lu et al. ............................ 106/400 |

* cited by examiner

PROCESS AND APPARATUS FOR PREPARING PIGMENT FLUSH

This is a divisional of application Ser. No. 09/397,801, filed Sep. 17, 1999.

FIELD OF THE INVENTION

The present invention relates to processes for preparing pigment flushes, particularly pigment flushes for ink compositions. The present invention also relates to methods for preparing ink bases and finished ink compositions.

BACKGROUND OF THE INVENTION

Syntheses of many organic pigments include a coupling step in a dilute aqueous medium to produce a slurry of the pigment product, which is typically followed by filtering the slurry in a filter press to concentrate the pigment. The press cake that results is then either dried to provide a dry, particulate pigment or else is "flushed" with an organic medium such as an oil and/or resin to transfer the pigment particles from the aqueous press cake to the oil or resin phase. Flushing assists in keeping pigment particles non-agglomerated and easier to use in making inks or coatings. The flushing process requires additional time and materials over simply drying the pigment. If the pigment is used in an ink or coating composition, however, it must first be well-dispersed in an appropriate organic medium in order to achieve the desired color development and stability, and thus the flushing process is advantageous because it accomplishes the transfer without intermediate steps of drying the pigment and grinding the pigment in the organic medium to produce the pigment dispersion.

In the past, pigment flushes have usually been prepared by batch processes in which the press cake is kneaded with an organic phase such as an oil and/or a resin, for example in a sigma blade mixer or dough mixer, to flush the pigment particles from the water phase to the organic medium phase and displace the water as a separate aqueous phase. The displaced water is separated and the dispersion of the pigment in the varnish can be used as a pigment paste in preparing an ink or paint.

The batch process has many shortcomings. First, the steps of adding varnish, kneading the dough to displace the water, and pouring off the water must usually be repeated a number of times in order to obtain the optimum yield and a product with the desired low water content. This is a labor-intensive process that requires careful monitoring. Further, in order to remove the residual water, the batch must be further treated, such as by heating and stripping under vacuum. For many pigments, the heat history from processing to remove the residual water may result in a color shift. Further, the process is time-consuming and inefficient. Finally, it is difficult to reduce the water content below about 3% by weight, even with the vacuum stripping.

Continuous flush processes have been suggested in the past, but those processes have also had shortcomings. Higuchi et al., U.S. Pat. No. 4,474,473, describe a process for continuously flushing pigment press cake on equipment that includes a co-rotating, twin screw extruder. The process requires a press cake that has a pigment content of 35 weight percent or more. The '473 patent discloses that press cakes having a pigment content of from 15 to 35 weight percent cannot be used in the continuous process because of problems with obtaining constant flow feeding. The range of 15 to 35 weight percent, however, is the range of pigment content that is typically obtained for press cakes. While dilution of the press cake with water to form a liquid slurry of low pigment content was previously suggested, the '473 patent takes the opposite direction of increasing pigment content to 35% or more to provide a "lump cake" that is apparently suitable for constant flow feeding as a free-flowing solid. Increasing the pigment content of the manufactured press cake, however, requires a time-consuming process of shaping the press cake and drying it with circulating air until the desired water content is obtained.

An example of the methods using diluted press cake is Rouwhorst et al., U.S. Pat. No. 4,309,223. This patent discloses a process of preparing a pigment flush from a press cake using a single screw extruder. The process uses a slurry containing only about 0.5% to 10% by weight pigment. When so much water is added during the flushing process it is difficult to get a clean break or separation between the phases. In addition, more aqueous waste is produced. Finally, it is often the case that the single screw extruder does not provide a sufficient amount of mixing shear to adequately flush the press cake.

Anderson et al., U.S. Pat. No. 5,151,026, discloses an extruder apparatus for removing liquid from an aqueous mass of comminuted solids such as crumb rubber, wood pulp, and ground plastic materials that are cleansed during recycling processes. The water is squeezed out of the aqueous mass in a pinch point. The pinch point pressure results from applying a backward force by means of a reverse-threaded section of the screw immediately at the liquid extraction location. The Anderson process removes from water relatively large solid pieces that do not appear to associate or agglomerate. Unlike the Anderson process, the pigment flush process concerns transfer of fine pigment particles from aqueous press cake to an organic phase, usually including a resin, followed by separation of the two liquid phases (aqueous and organic). Two key considerations in the flush process are clean separation of the organic and aqueous phases and good dispersion of the pigment particles. The pinch point method is unsuitable for the two-phase pigment flushing process because the pinching force would interfere with the necessary phase separation between aqueous and organic phases. The pigment particles also have a tendency to agglomerate. The pinch point would thus be unsuitable for the additional reason that squeezing the pigment would cause undesirable agglomeration of the pigment particles, which would in turn impair dispersion of the pigment.

SUMMARY OF THE INVENTION

The invention provides a process for continuous production of pigment flush from conventional press cake. In a first step, at least one pigment press cake is homogenized to a fluidized mass. In a second step, the homogenized press cake is fed at a controlled rate into a twin screw extruder. The twin screw extruder may receive more than one stream of fluidized press cake. An organic medium, which may include organic components selected from solvent, varnish, oil, and/or resin, is also fed into the extruder, and the press cake and organic medium are mixed in a first zone of the extruder to wet the pigment with the organic medium, displacing water from the press cake and producing a crude pigment flush. The displaced water is removed in a second zone of the extruder. The second zone of the extruder includes a port for removing the displaced water, especially by draining the water, and preferably includes a dam that retains the pigment flush in the second zone for a time sufficient to allow most of the displaced water to be removed from the crude flush mass. The extruder preferably includes a third zone that has one or more vacuum ports to draw off residual water clinging to the pigment flush.

The invention also provides a method for continuous production of an ink base or a finished ink from a pigment press cake. The method includes the steps just outlined for the process of the invention for producing a pigment flush and at least one an additional step of introducing into the extruder, at some point before the pigment dispersion is discharged, preferably after the optional vacuum zone, one or more additional ink components, such as a varnish, pigmented tinting or toning compositions, solvent, and/or additives, to make an ink base or a finished ink composition.

The invention further provides an apparatus that includes a press cake feed system and a twin screw extruder. The press cake feed system is used to fluidize the press cake and feed the fluidized press cake to the extruder. The press cake feed system applies shear to the press cake to convert the crumbly, agglomerating material into a smooth, fluid dispersion. The feed system then transfers the fluidized press cake to the twin screw extruder. The twin screw extruder of the apparatus has at least two zones. In a first zone, the fluidized press cake and an organic medium are fed into the extruder and mixed. The action of the first zone transfers the pigment to the organic medium and produces a separate water phase. In a second zone of the extruder, the water phase is at least partially removed. In an optional third zone, a residual portion of water is removed from the pigment flush by vacuum. The extruder may also optionally have a fourth zone with at least one addition port by which additional ingredients are added and which provides additional mixing to prepare an ink base or finished ink composition.

The invention offers an advantage over previous processes in that it provides continuous processing of conventional press cakes. Press cakes are usually prepared having pigment contents of from about 15% to about 35%. Because the present invention can process press cakes as prepared, it is possible to eliminate a cumbersome preliminary evaporation step to increase pigment content of the press cake to the point at which the press cake can be flushed or a diluting step in which the press cake is reduced to a very low solids slurry for processing using the prior art methods.

The invention offers a further advantage of providing more control for a continuous flushing process, which results in increased consistency of color and other properties of the pigment dispersion.

The invention offers a still further advantage of providing a continuous process for manufacturing ink base or a finished ink product from a continuous feed of conventional press cake.

DETAILED DESCRIPTION

The invention provides a process in which a pigment in press cake form is flushed by transferring the pigment particles from the aqueous press cake to an organic medium, especially to an oil or resin phase. The press cake may be from the synthesis of any of a number of organic pigments. Examples of suitable press cakes include, without limitation, press cakes of diarrylide yellow pigments e.g., Pigment Yellow 12), phthalocyanine pigments, calcium lithol red, alkali blue, barium lithol red, rhodamine yellow, rhodamine blue, and so on. Press cakes of organic pigments typically have a water content by weight of from about 12% to about 30%, although press cakes such as those of certain blue pigments may have a water content as high as 45%.

Figure 1:
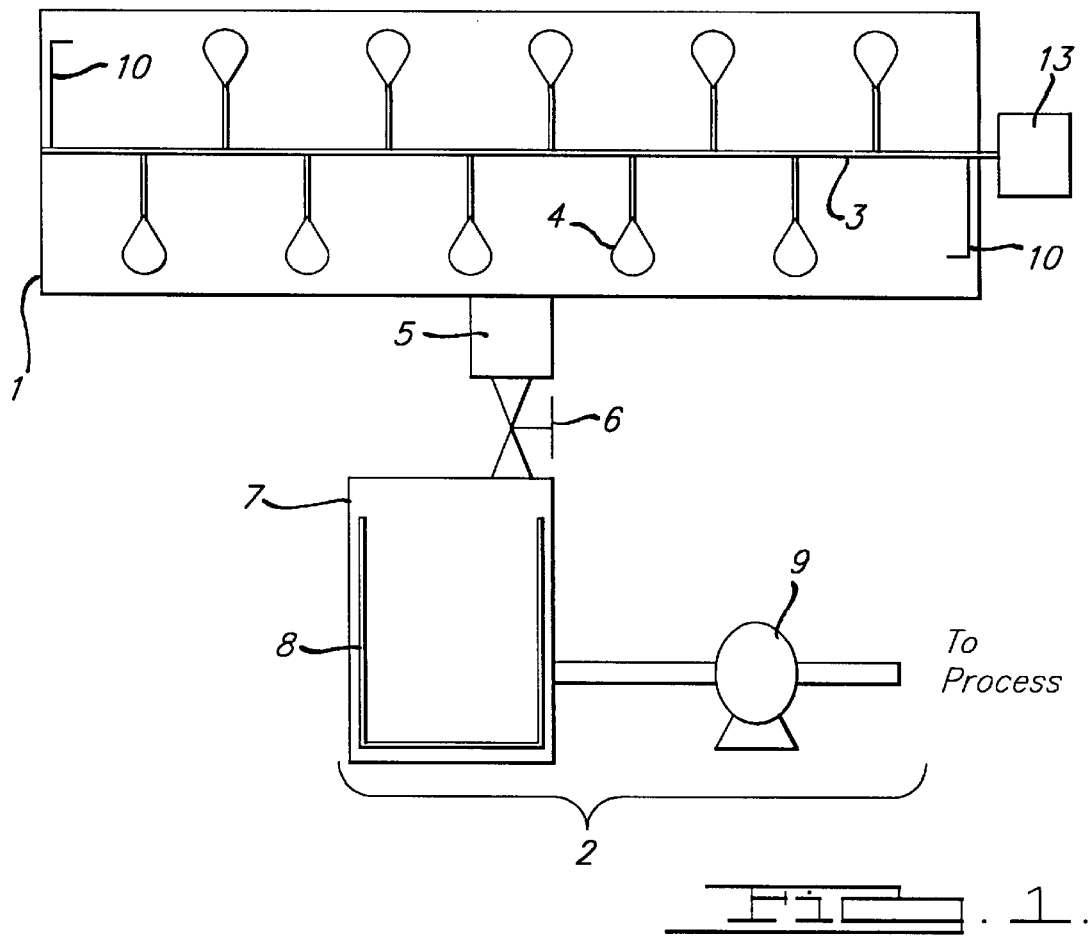
FIG. 1 is a schematic diagram of one embodiment of the press cake feed system of the invention.
Figure 3:
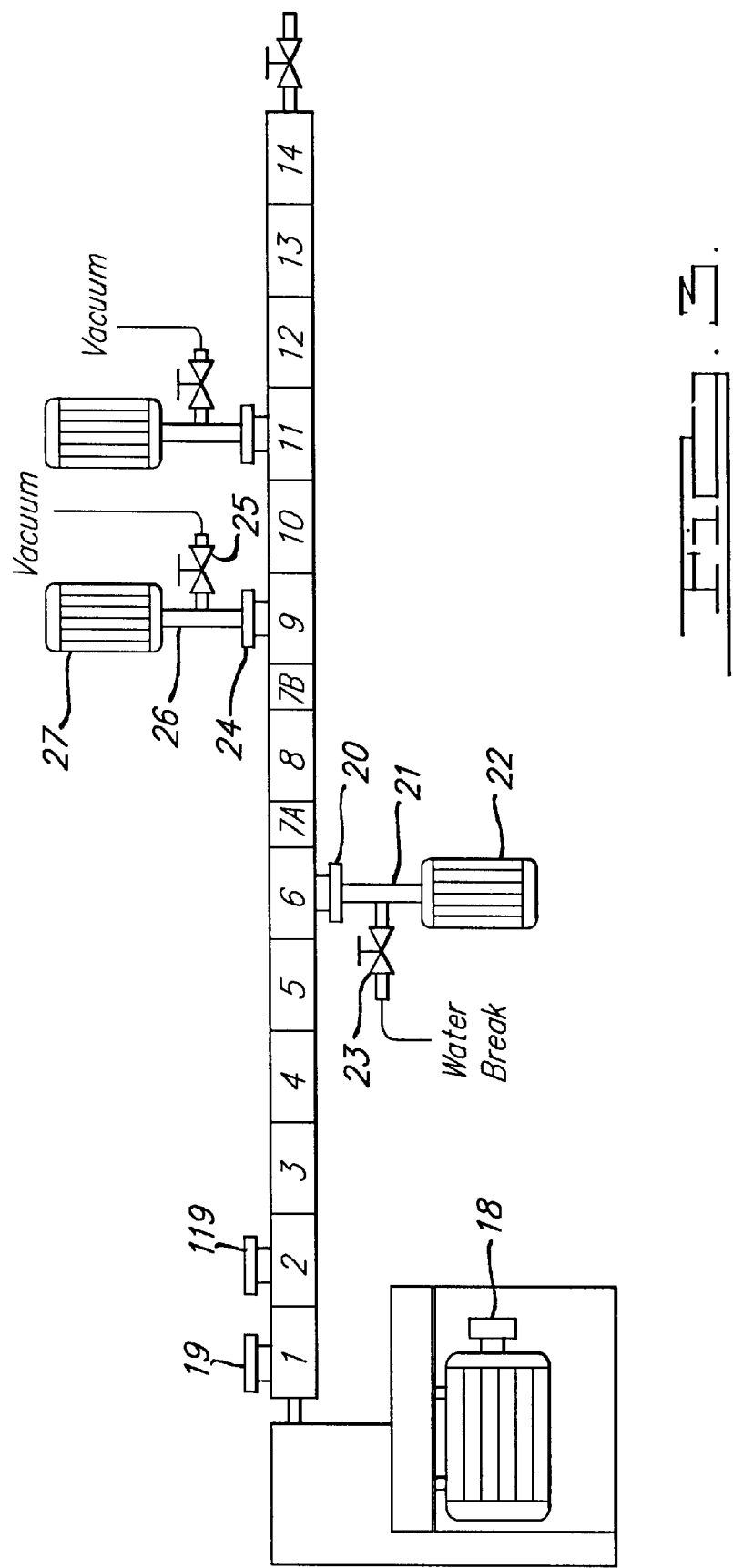
FIG. 3 is a schematic diagram of one embodiment of the twin screw extruder of the present invention.

The invention further provides an apparatus that includes at least one press cake feed system, a preferred embodiment of which is shown in FIG. 1, and a twin screw extruder, a preferred embodiment of which is shown in FIG. 3. The press cake feed system fluidizes the press cake and feeds the fluidized press cake to the twin screw extruder. The press cake feed system may include two components that carry out these actions, a fluidizing component such as 1 in FIG. 1 and a feed component such as 2 in FIG. 1. The fluidizing component applies shear to the press cake to break up the bridging between the individual particles that gives the press cake its pasty or plaster-like consistency. The amount of shear is sufficient to produce a fluidized press cake. The amount of shear should not be excessive, as too much shear will beat air into the fluidized press cake, making it difficult again to feed into the extruder. Suitable examples of the fluidizing component are, without limitation, a ribbon mixer, a paddle mixer, an auger screw, and a helical mixer. FIG. 1 shows as one preferred embodiment of the fluidizing component a paddle mixer 3 driven by motor 13. Paddle mixer 3 shows ten paddle mixing elements 4, but the size of the paddle mixer and the number of mixing elements can be varied widely to suit the particular situation, such as the desired throughput of the continuous process. Scrapers 10 may be included to scrape the walls and keep the press cake inside the mixer. If necessary, the mixer may be cooled with the aid of a cooling jacket (not shown), by air cooling, or otherwise.

The fluidizing component has a orifice 5 through which the fluidized press cake exits the fluidizing component. The fluidized press cake may be discharged from the fluidizing component by pushing the fluidized press cake through the orifice with a valve 6, as is shown in FIG. 1, to control the flow of fluidized press cake from the fluidizing component. Alternatively, the fluidized press cake may be drawn from the fluidizing component with vacuum or pumped from the fluidizing component. In a preferred embodiment, the fluidized press cake is fed into a holding tank 7 as shown in FIG. 1. Holding tank 7 is equipped with a blade 8 that rotates along the perimeter and serves both to prevent re-bridging between the pigment particles of the fluidized press cake and to aid in feeding the press cake to feed pump 9. Feed pump 9 provides fluidized press cake to the extruder. Holding tank 7 allows the fluidizing operation taking place in paddle mixer 3 to be carried out in a batch or semi-batch manner, with all or part of the fluidized press cake in the mixer being emptied to the holding tank at intervals. Thus, press cake can be fluidized in a batch method with a portion of press cake being introduced to the mixer, mixed until fluidized, then the fluidized portion passed on to the holding tank. The mixer may then be charged with a new batch of press cake, which is fluidized. The fluidized press cake may be immediately introduced to the holding tank or held in the mixer for a desired time and then introduced to the holding tank. Alternatively, a semi-batch process may be employed in which at certain intervals a part of the fluidized press cake is passed from the mixer to the holding tank, after which additional press cake is added to the material remaining in the mixer.

It is also possible to forego the holding tank in the press cake fluidizing component. In this embodiment (not shown), the fluidized press cake is passed at a continuous rate from the mixer through the pump to the extruder. In this embodiment of the invention, new press cake is fed into the mixer at a rate sufficient to insure that the mixer does not empty and that the average dwell time of the press cake in the mixer is adequate to fluidize the press cake.

The feed component of the press cake feed system feeds the fluidized press cake to the extruder. Preferably, the feed component includes a pump. The pump may be any type suitable for the viscosity of the fluidized press cake. Examples of suitable pumps include, without limitation, lobe pumps, gear pumps, or other positive displacement pumps.

Figure 2:
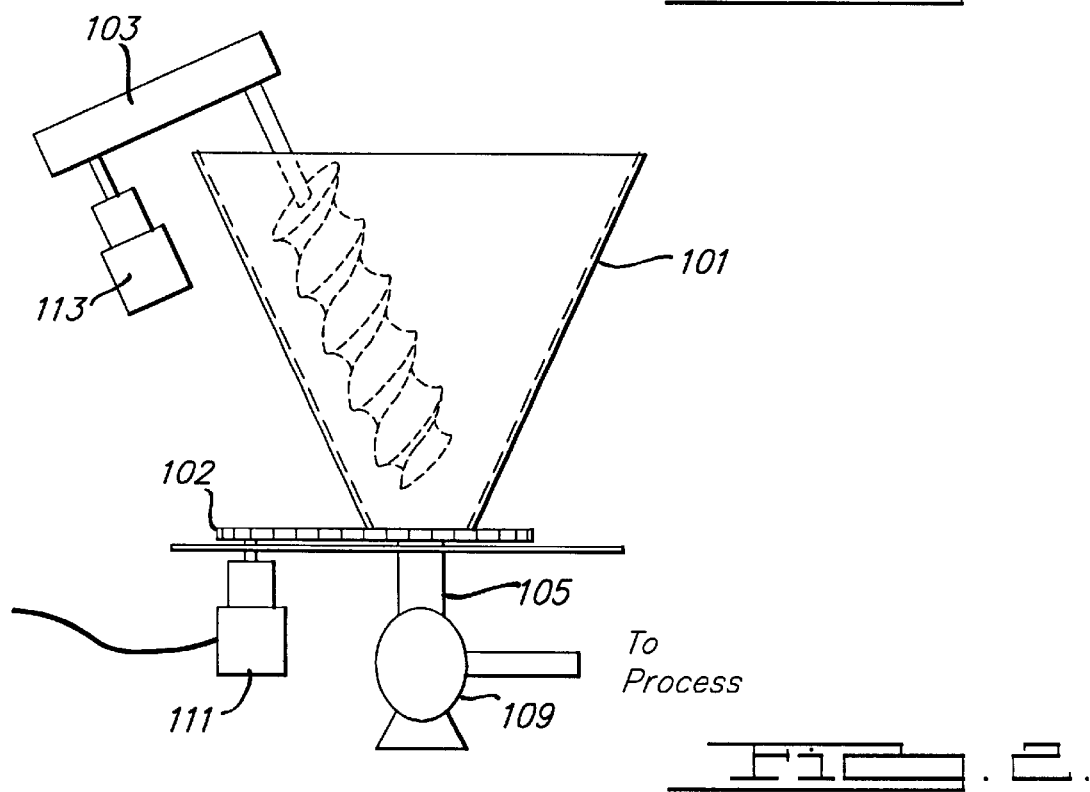
FIG. 2 is a schematic diagram of an alternative embodiment of the press cake feed system of the invention.

In the alternative preferred embodiment shown in FIG. 2, the press cake feed system has a fluidizing component that includes a conical container 101 that preferably rotates by gear 102 driven by motor 111 and a stationary two-screw auger 103 (front screw shown) with motor 113 that applies shear to the press cake. The press cake is fluidized by the action of the two-screw auger. The auger also serves to convey the fluidized press cake to an orifice 105 at the bottom of the conical container. The fluidized press cake expelled from the orifice is fed to the extruder, again for example by pump 109, with or without a holding tank for the fluidized material, as in the first embodiment.

The feed component introduces the fluidized press cake to port 19 at the beginning of an extruder shown in the preferred example of FIG. 3. The extruder has at least two zones, and optionally has a third and/or a fourth zone. In a first zone, represented in the figure by sections 1 through 5, the fluidized press cake and organic medium are fed into the extruder and then mixed to flush the pigment from the aqueous phase to the organic phase. In a second zone, represented by sections 6 through 8, at least a portion the water displaced during the flushing operation is removed by draining or drawing the liquid from the extruder. In a third zone, which is optional but preferred, represented by sections 9 through 11, residual water is removed (as water vapor) by vacuum dehydrating the pigment flush through one or more vacuum ports. In the fourth zone, also optional, represented by sections 12 through 14, the flush is further mixed and one or more other ink components may be added and mixed with the pigment flush. The optional fourth zone can be used to produce an ink base or finished ink composition product.

The extruder is a twin-screw extruder, with the screws being driven by motor 18. The screws are preferably co-rotating. At least one fluidized press cake is fed into the extruder through port 19. In one preferred embodiment, a second fluidized press cake is fed into the extruder through a port 19 or through a second port 119. A liquid organic medium, preferably including at least an oil, a resin, or resin solution, is also fed into the extruder, which may be through port 19 or through a second port 119. The liquid organic medium is sufficiently hydrophobic to allow a non-aqueous phase to form in the process. Types of organic materials that are suitable to prepare pigment are well-known in the art. If the extruder has two different fluidized press cake feeds by ports 19 and 119, the organic medium may be fed through either or through yet another separate port.

Typical kinds of resins and oils that may be used for flushing varnishes include, without limitation, alkyd resins, phenolic resins, polyesters, hydrocarbon resins, maleic resins, rosin-modified varnishes of any of these, polyamide resins, polyvinyl chloride resins, vinyl acetate resins, vinyl chloride/vinyl acetate copolymer resins, chlorinated polyolefins, polystyrene resins, acrylic resins, polyurethane resins, ketone resins, vegetable oils including linseed oil, soybean oil, neatsfoot oil, coconut oil, tung oil, mineral oils, and so on. Combinations of such resins and oils may also be employed. The resin, oil, or combination thereof may be combined with a hydrophobic organic solvent or liquid, including high boiling petroleum distillates.

As mentioned, the organic medium may be introduced in the same barrel, or section, of the extruder as the fluidized press cake, whether in the same port or a different port. Alternatively, the organic medium may be introduced in another section close to the front of the extruder in the first zone, as shown in FIG. 3 by the port 119. The organic medium may be fed from a line or tank, which may have a stirrer, and may be metered in with, for example, a pump. Preferably, the organic medium and the fluidized press cake are each introduced at fairly constant rates. The relative amounts of the organic medium and the fluidized press cake for optimum processing can be determined based upon the particular materials chosen, but in general the amounts remain the same as those expected for conventional batch processing. For example, the amount of organic medium introduced per unit of time may be from about 0.6 to about 2 times the amount of solid pigment introduced in the same unit of time. The ratio of organic medium to solid pigment may be adjusted according to factors known in the art, such as the type of pigment and the type of organic medium.

The fluidized press cake and organic medium are mixed in one or more sections of the first zone of the extruder to wet the pigment with the organic medium, displacing water from the press cake and producing a crude pigment flush. A special screw section with a plurality of kneading disks may be used in the first zone where the flushing takes place. In one preferred embodiment of the invention, the screw profile in the first zone tapers from a deep channel used in the section or sections having a feeding port gradually to a shallow channel in a later (downstream) section or section of the first zone. The length of the first zone of the extruder in which the fluidized press cake and the organic medium are mixed is sufficiently long so that the pigment is flushed completely. The rotational speed of the screw also is a factor for efficient flushing. A preferred range for rotational speed of the screw is from about 150 to about 550 rpm, and a more preferred range for rotational speed is from about 450 to about 550 rpm.

The displaced water and the crude pigment flush continue in the extruder to the second zone of the extruder where at least a portion of the displaced water is removed. In the second zone, preferably a major portion of the is placed water is removed, more preferably at least about 80%, still more preferably at least about 90%, and even more preferably all but a residual amount of water that clings to the pigment flush is removed. Referring to FIG. 3, the second zone of the extruder includes sections 6–8. The second zone of the extruder includes a port or vent 20 for removing, preferably by draining off, the displaced water. While the water may be withdrawn by other means, gravity draining is the simplest and is therefore preferred. The port 20 shown in the figure is connected on the other side to a section 21 having therein a screw turned by motor 22 that drives the relatively viscous pigment-containing flush back into the section 6 while letting the water drain out of section 6. Collected water is drained via valve 23.

Figure 4:
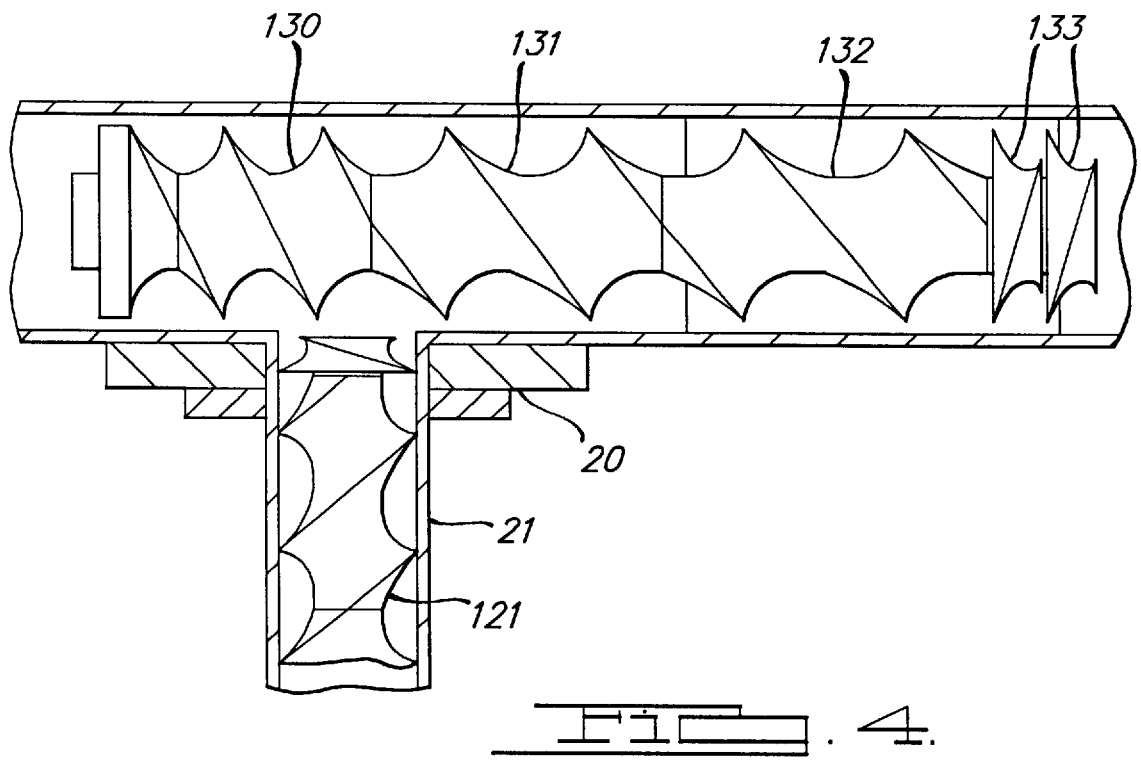
FIG. 4 is a partial schematic view of the water separation zone of the invention.

One important feature of the second zone is a dam that retains the pigment flush for a time sufficient to allow most of the displaced water to drain from the crude flush mass. The dam causes the kneaded press cake/organic medium to dwell over the port long enough to allow more of the displaced water to drain from the kneaded pigment. A portion of the mixture of press cake and organic medium is carried into the dammed section of the extruder and remains in that section until the portion works its way out of the pocket of retained material and is carried into the next section by the grabbing action of the screw. The dam is shown in more detail in FIG. 4. FIG. 4 shows the screw sections in sections 6 to 8 of the second zone. The features of section 6 are the port 20, side section 21 (shown in part) containing screw 121, and screw section 130. Screw section 130 has relatively tight threads to remove material from the mixing zone. Screw sections 131 and 132 in marked barrels 6 and 7a have threads that are less tight to increase residence time and allow open room for water to drain. The screw sections designated by 133 are reverse threaded in a tight thread to provide sufficient reverse flow to cause the material to fill a section of 7a (for example, about 30 mm). The reverse flow force that causes the damming effect is limited so that there is no squeezing, as squeezing would tend to produce an emulsion of the aqueous and organic phases, impairing the desired separation of water from organic phase. Because the draining port 20 is relatively far upstream from the reverse screws, the effect of the reverse flow is to cause material to accumulate before eventually flowing over the created dam and/or being pulled on by forward-turning screws located further downstream. The water is not engaged by the forward screws and does not flow over the accumulated material. Instead, the water is held in the second zone to drain.

Because more of the water is drained from the flush in a liquid phase instead of being evaporated, as compared to prior methods, the final product contains a lower concentration of salts. The dam thus improves the purity of the product.

The third zone of the extruder, which is optional but preferred, includes one or more vacuum ports 24 connected to vacuum at valves 25 to draw off residual water clinging to the pigment flush. The water is drawn off as water vapor. Suitable vacuum ports are known to be used with extruders and typically can include a section 26 containing a screw turned by motor 27 in the vacuum port to help retain the flush in the extruder. A vacuum pump is typically connected to the vacuum port to provide the reduced pressure. The profile of the screw used for the vacuum section preferably has a shallow channel, which tends to increase the efficiency of vacuum dehydration by shaping the material in a thin layer form. FIG. 3 shows identical vacuum ports on consecutive extruder sections.

The present process is particularly advantageous for preparing flushes of pigments that are heat-sensitive, including, without limitation, diarrylide and rhodamine pigments such as diarrylide yellow, rhodamine yellow, and rhodamine blue. Because the time during which the pigment is exposed to higher temperatures is minimized by the process of the invention, pigments that may discolor when exposed to heat may be made more reproducibly and without significant color degradation.

Figure 5:
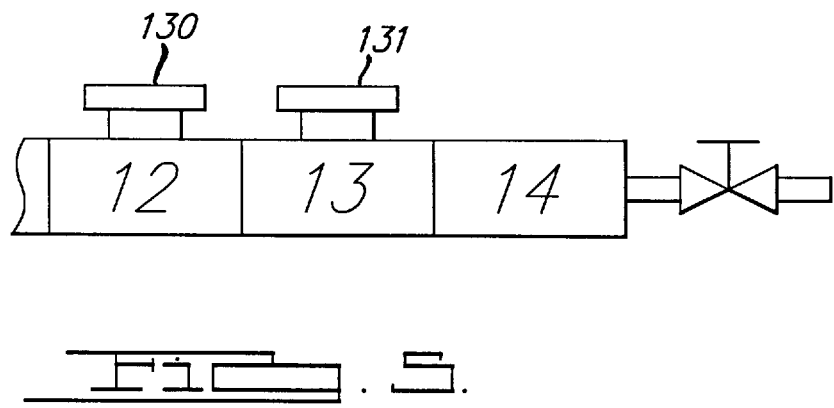
FIG. 5 is a partial schematic view of an alternative embodiment of the extruder showing the fourth zone.

The pigment flush produced by the inventive process may be used to prepare an ink composition according to usual methods. Additional resins, oils, solvents or other components of the organic medium may be added after the vacuum port to adjust the composition of the pigment flush. FIG. 5 shows an alternative fourth zone having ports 130 and 131 for addition of one or more further materials.

Alternatively, the pigment flush may be made into an ink base or a finished ink composition as a further step of the continuous process of the invention by introducing additional materials such as varnish, other resins, organic solvent and/or additives into the extruder at some point before the pigment flush is discharged, preferably after the vacuum zone, such as into port 130 or port 131. The flushed pigment dispersion and other ink component(s) are combined in the extruder so that the output from the extruder is an ink base or ink composition. Typical resins used as ink varnishes that may be added include, without limitation, alkyd resins, polyesters, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, vinyl resins including acrylic resins, polyvinyl chloride resins, vinyl acetate resins, polystyrene, and copolymers thereof; polyurethanes, polyamide resins, and so on. Combinations of such resins may also be employed. Suitable example of organic solvents that may be added include, without limitation, aliphatic hydrocarbons such as petroleum distillate fractions and normal and isoparaffinic solvents with limited aromatic character. Any of the many additives known in the art that may be included in the ink compositions of the invention, so long as such additives do not significantly detract from the benefits of the present invention. Illustrative examples of these include, without limitation, pour point depressants, surfactants, wetting agents, waxes, emulsifying agents and dispersing agents, defoamers, antioxidants, UV absorbers, dryers (e.g., for formulations containing vegetable oils), flow agents and other rheology modifiers, gloss enhancers, and anti-settling agents. When included, additives are typically included in amounts of at least about 0.001% of the ink composition, and the additives may be included in amounts of up to about 7% by weight or more of the ink composition.

The invention is illustrated by the following example. The example is merely illustrative and does not in any way limit the scope of the invention as described and claimed. All parts are parts by weight unless otherwise noted.

EXAMPLE OF THE INVENTION

A twin screw co-rotating extruder with a screw diameter of 44 mm, L/D of 56, and a speed of 450 rpm was used to produce the pigment flush. The table below summarizes the addition points, rates and temperatures of the extruder depicted in FIG. 3.

| Barrels | 1 | 2 | 3–5 | 6–8 | 7b–11 | 12 | 13 | 14 |
|---|---|---|---|---|---|---|---|---|
| Function | add | add | mixing | water break | vacuum dehydration | mixing | let down | mixing |
| Feed | wet cake, alkyd | varnish | — | — | — | — | varnish and oil | — |
| Jacket | none | heat | heat | heat | heat | heat | cool | cool |
| Temp | — | — | 210 F. | — | 215 F. | 260 F. | — | 140 F. |

First, a 22% lithol rubine press cake was fluidized to a homogenous mixture in a 5 hp ribbon mixer. After mixing, the fluidized press cake was put into a feeder (a 25 hp helical mixer). The fluidized press cake was fed at 124 lbs/hr using a gear pump, through a mass flow meter and into barrel 1. The alkyd varnish was feed at 7 lbs/hr into barrel 1 using a gear pump. A first hydrocarbon varnish was charged into barrel 2 at 29 lbs/hr. This mass was then mixed through the end of barrel 5.

The water was drained from the pigment/varnish mass in barrels 6–8. The water was fairly clear and exited at 210° F. Barrels 7b–11 were the vacuum dehydration zone. Vacuum ports were installed at barrels 9 and 11.

The flush was further mixed in Section 12. In Section 13, the pigment flush was reduced by addition of 11 lbs/hr of a hydrocarbon varnish and 3.3 lbs/hr of a hydrocarbon oil and allowed to cool. The pigment flush, hydrocarbon varnish and hydrocarbon oil were further mixed and cooled in Section 14. The resulting product was a shade converted flush with less than 2% water content.

The invention has been described in detail with reference to preferred embodiments thereof. It should be understood, however, that variations and modifications can be made within the spirit and scope of the invention and of the following claims.

What is claimed is:

1. An apparatus, comprising
    a press cake feed system, wherein said press cake feed system includes a shear component for fluidizing a press cake and a feed component for feeding the fluidized press cake;
    a source of organic medium;
    a twin screw extruder connected to the feed component, wherein said twin screw extruder includes
        a first zone with a port that receives the fluidized press cake from the feed component and mixes the fluidized press cake with the organic medium; and
        a second zone downstream of the first zone comprising an outlet for at least partially removing the water phase.

2. An apparatus according to claim 1, wherein said extruder further includes a third zone downstream of the second zone comprising at least one vacuum port.

3. An apparatus according to claim 2, wherein the twin screw extruder further comprises a fourth zone downstream of the third zone that includes at least one addition port.

4. An apparatus according to claim 1, wherein said second zone comprises a partial dam that impedes the progress of the pigment flush out of the second zone for a desired time.

5. An apparatus according to claim 4, wherein said partial dam comprises a reverse threaded screw section.

6. An apparatus according to claim 1, wherein said first zone includes a plurality of kneading disks.

7. An apparatus according to claim 1, wherein the apparatus includes more than one press cake feed systems, each connecting to a port in the first zone.

8. An apparatus according to claim 7, wherein each press cake feed system connects to the same port in the first zone.

9. An apparatus according to claim 7, wherein each press cake feed system connects to a different port in the first zone.

10. An apparatus according to claim 1, wherein the press cake feed system further comprises a reservoir for maintaining the fluidized press cake upstream of the feed component.

* * * * *